May 24, 1960   J. VAN TASSEL   2,937,651
AUTOMOBILE TENT MOUNTING
Filed Nov. 19, 1957   2 Sheets-Sheet 1
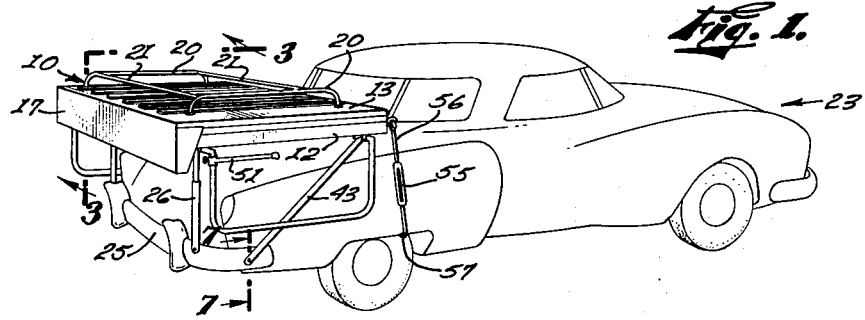
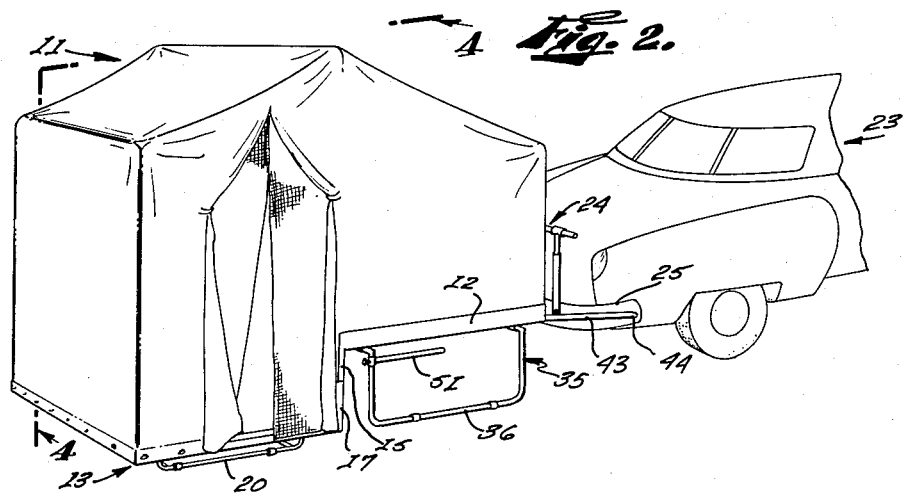
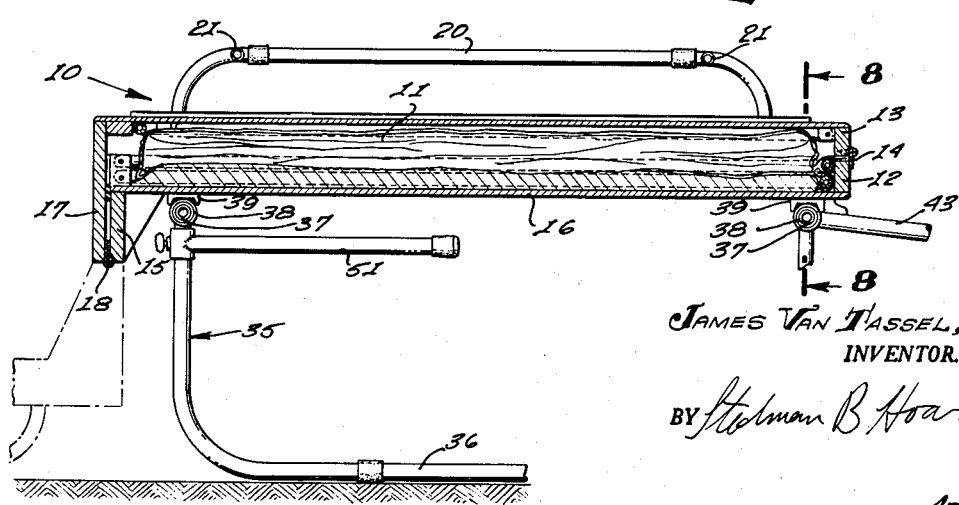
JAMES VAN TASSEL,
INVENTOR.
BY
AGENT.

May 24, 1960   J. VAN TASSEL   2,937,651
AUTOMOBILE TENT MOUNTING
Filed Nov. 19, 1957   2 Sheets-Sheet 2
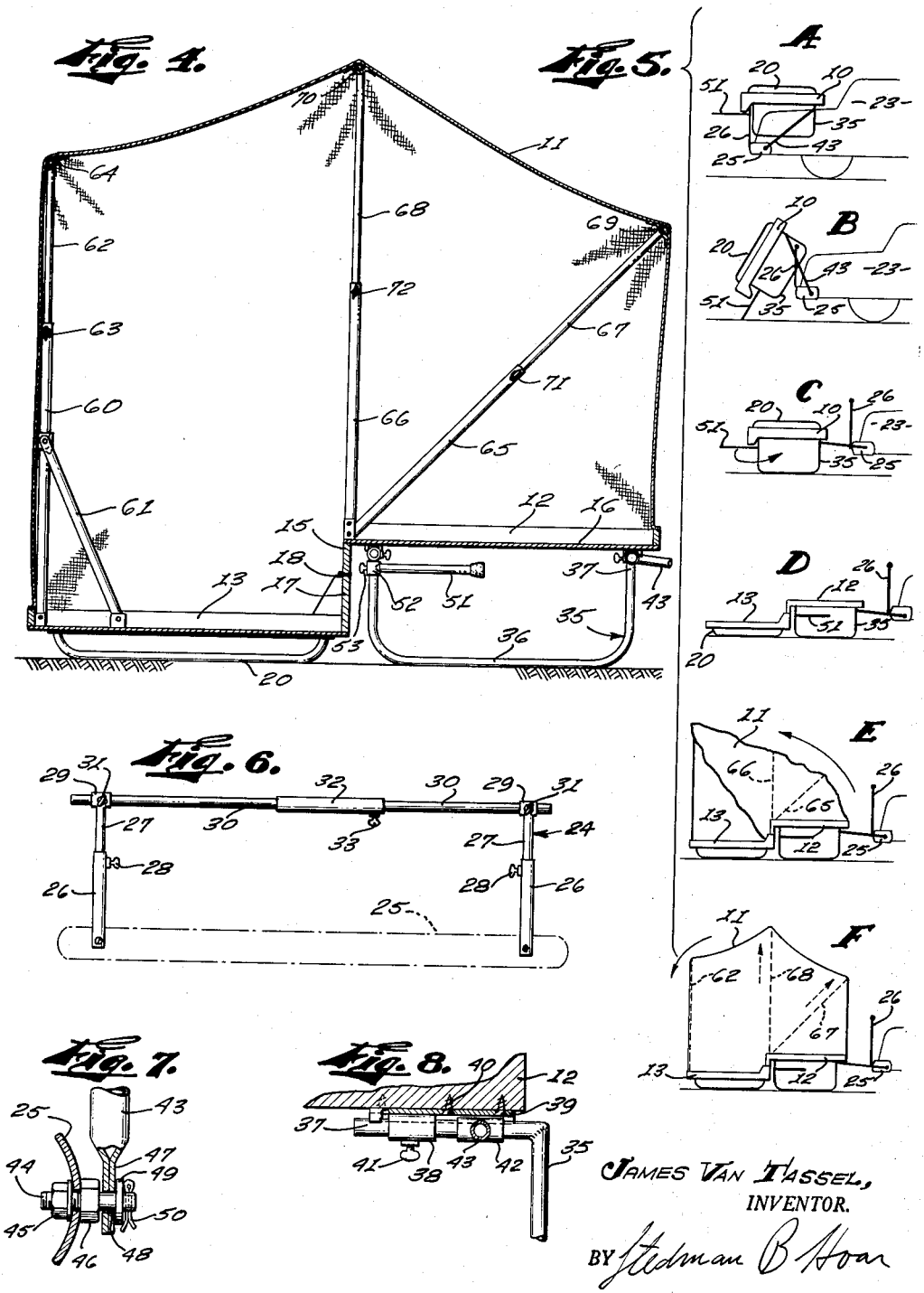
James Van Tassel,
INVENTOR.

United States Patent Office 2,937,651
Patented May 24, 1960

2,937,651

AUTOMOBILE TENT MOUNTING

James Van Tassel, 2437 Heliotrope Drive,
Santa Ana, Calif.

Filed Nov. 19, 1957, Ser. No. 697,457

2 Claims. (Cl. 135—4)

This invention relates to tents, and more particularly relates to a mounting or frame for a tent adapted to be transported on an automobile in knocked-down condition and to be set up while still attached to the automobile.

It is an object of this invention to provide a tent which folds during travel into a box which may be carried on the rear deck of an automobile, and which unfolds in such manner that the box becomes a floor of the unfolded tent, for the greater comfort of the occupants.

Another object of my invention is to provide a tent and a frame therefor the unfolding and folding of which is a one-man job, so that a person travelling by himself can provide over-night comfort for himself, while still providing space for two people if there be that many.

A further and important object is to provide a tent stored in folded condition on the conventional rear luggage compartment of an automobile which can be moved from its travelling position and returned thereto, so that luggage becomes accessible, without unfolding the tent.

Still another object of the invention is to provide a tent floor which reverses when the tent is folded on the luggage compartment and becomes a roof protecting the tent, and which also has rails to keep it from the ground when in use, which rails become available for straps for securing additional luggage or other articles.

A further object is to provide a tent which is supported by the attached automobile when erected, but which, if it is then desired to use the automobile, may be very simply and easily detached and left standing while the automobile is used for other purposes.

In the accompanying drawings, not intended to be limiting but offered as examples of a preferred embodiment of my invention, Fig. 1 is a perspective view of my improved automobile tent folded on the back of an automobile;

Fig. 2 is a similar perspective view showing the tent unfolded and set up ready for occupancy;

Fig. 3 is an enlarged sectional view on the line 3—3 of Fig. 1, showing the tent folded in its floor box, but moved onto the ground as in diagram C of Fig. 5;

Fig. 4 is a vertical sectional view or an intermediate scale on the line 4—4 of Fig. 2, showing the interior of the erected tent;

Fig. 5 is a schematic view showing successive steps in erecting the tent;

Fig. 6 is an elevational view of a support bar attached to the rear bumper of an automobile, for holding the folded tent in elevated position so that it will not scratch the paint;

Fig. 7 is a sectional view on an enlarged scale on the line 7—7 of Fig. 1, showing the separable attachment of the tent to the automobile; and Fig. 8 is another sectional view on the line 8—8 of Fig. 3, showing the connection between the box-floor of the tent and one of the supports which keeps the box floor above mud and water.

Having reference now to the details of the drawings, my improved tent mounting comprises a box 10 into which the canvas tent proper 11 and the various frame parts which hold the canvas erect may be folded. The box 10 has a lower part 12 and a lid 13, which may be fastened when closed by snap-hooks 14. At the opposite side from the snap hooks 14, the box portion 12 has a descending side 15 which descends below the floor 16 of the box portion 12. Correspondingly, the lid 13 has an elongated side 17 which, when the lid is closed, lies outside and parallel to the side 15, and is connected thereto by hinges 18. Accordingly when the hooks 14 are released, the lid 13 may be lifted and swung back, and will tend to take a position parallel to and at a lower level than the box portion 12, when the side 17 is in downward prolongation of the side 15.

Across the top of the lid 13 are side bows 20, secured to the lid and connected by rails 21. The resulting quadrangle of bows and rails forms a support under the lid 13 to keep the lid off the ground when the lid is swung back as heretofore described, and when the lid is closed on the box portion 12 it forms an upstanding grid within which articles of luggage may conveniently be placed and be secured by any system of ropes or straps (not shown).

The box 10 is intended to be carried on the luggage compartment cover or "rear deck" of an automobile 23, and when so carried it must obviously be easily removable to afford access to the luggage compartment and also must be supported, preferably in a level position, so as not to scratch or dent the automobile. For this latter purpose, a support 24 is erected at the rear of the automobile, preferably being attached to the rear bumper 25, as on present day models of automobiles that bumper is conveniently located. The support 24, shown in detail in Fig. 6, comprises two tubular upright members 26, into which two other tubular members 27 may be telescopically adjusted and held by thumb screws 28. The upper ends of the members 27 are fitted with T-heads 29, through which members 30 extend and are held by thumb-screws 31. The members 30 are joined in the center of the support 24 by a telescopic member 32 which may be affixed to one of the members 30 by a thumb screw 33. It will be seen that the support 24 can be raised or lowered, and that by sliding the telescopic member 32 to one side or the other the members 30 may be swung out of alignment, or separated endwise. It is desirable the support 24, which may on occasion become the only part of my tent mounting attached to the automobile, should be capable of taking inconspicuous and out-of-the-way positions.

Secured to the bottom portion 12 of the box 10, at both sides thereof, are bows 35, separated laterally so that they may each extend down one side of the rear deck of the automobile and extend downwardly so that their flat bottom rails 36 will be at a level (i.e. ground level) with the bows 20 of the box lid 13 when the latter is opened. The upper ends 37 of the bows 35 are turned inward (Fig. 8) and extend through fittings 38 secured as by welding to plates 39 which may be held to the box portion 12 by screws 40. The fittings 38 are provided with thumbscrews 41 so that the bows 35 may be tightened in place or loosened and removed. The bows 35 pass forwardly and rearwardly outside the ends of the support 24.

The forward upper ends 37 of the bows 35 are also provided with swivel fittings 42 which rotate upon the ends 37. From the swivel fittings 42 extend pivot struts 43. The other ends of the pivot struts 43 are secured pivotally to the automobile 24, for example to the bumper 25, and permit the whole box 10 to be swung upwardly and rearwardly for unfolding and erecting the tent, or upwardly and forwardly into carrying position on the rear deck of the automobile after the tent has been re-folded. The pivot struts 43 are so secured to the automobile that they may easily be disconnected therefrom. For example (Fig. 7) a bolt 44 may be secured to each end of the bumper 25 by nuts 45 and 46, and the compressed end 47 of the tubular pivot struts 3 may be provided with a hole 48 through which the bolt 44 extends, the bar being secured on the bolt by a washer 49 and cotter pin 50.

Legs 51 are pivotally secured to the bows 35 just below the rearward upper ends 37 of the bows, and are adapted by T-fittings 52 to swing at right angles to the bows. They may be held in any desired position by thumbscrews 53.

To hold the box 10 firmly when in carrying position, turn-buckles 55 may be secured to eyebolts 56 in the box and be hooked by hooks 57 under the fenders or other body parts of the automobile.

The operation of setting up my tent and tent mounting may best be understood from the diagrams of Fig. 5. The box 10 being in place upon the rear deck of an automobile, with the turn-buckles 55 removed and the box resting in part on the support 24, the legs 51 are swung rearwardly as shown in Fig. 5A and are secured by the thumbscrews 53. The box 10 is then pulled upwardly rearwardly, for example by means of the bows 20 or the nearest rail 21, and pivots on the pivot struts 43. The uprights 26 of the support 24 pass between the bows 35. As the box 10 falls rearwardly, it is caught upon the legs 51 in a temporary position as shown at 5B. The automobile is then moved forward to permit the bows 35 to make contact with the ground, as shown at 5C and the legs 51, no longer supporting the box 10 are swung forward within the bows 35. The snap-hooks 14 being released, the box lid 13 may be lifted and swung rearwardly by means of the bows 20 and finally be placed upon the ground, from which it is supported by the bows 20 at a level below the box portion 12 (Fig. 5D). From the open box portion 12 the tent 11 is then pulled and erected, with extension of the supporting frame as will now be described.

The tent 11 is provided with telescoping bows and braces to hold it erect. Preferably these are arranged so that that part of the tent above the box portion 12 gives head-room for a person sitting on the box portion 12, which may contain such articles as air-mattresses or pillows. The part of the tent above the reversed lid 13 gives standing room to a person. Two corner posts 60 swing upward and are held by braces 61. An extension bow 62 fits telescopically in the posts 60 and may be secured by thumbscrews 63. The bow 62 is sewed into a double layer 64 of the tent, and when erected to the limit of length of the canvas it provides headroom immediately under it. Two more sets of posts 65 and 66 swing upward from the forward corners of the box portion 12, with respective telescopically arranged bows 67 and 68 also sewn in the canvas at 69 and 70 and held by thumbscrews 71 and 72. When both the bows 67 and 68 are extended to the limit permitted by the canvas, and are secured, the tent is erect.

If now the occupant desires to go somewhere in his automobile, he does not have to refold the tent. The tent will be connected to the automobile only by the pivot struts 43, which may be easily disconnected from the bumper 25 by removing the nut 45. The tent remains standing.

It is believed that the reverse process of packing the tent and returning the box 10 to its position on the auto will be obvious.

If it is desired to obtain access to the luggage compartment, steps A, B, and C of Fig. 5, or possibly only steps A and B, are sufficient.

Numerous modifications which may be made without departure from the spirit and scope of the appended claims may be made by those skilled in the art, and the foregoing description is to be considered as an example and not an inflexible limitation of my invention.

I claim:

1. In a tent mounting for attachment to an automobile, a box having a bottom portion and a lid, said bottom portion having a side extending below the normal bottom of said bottom portion, said lid having a side coextensive with said extended side of said bottom portion and hinged thereto at the bottom thereof so that said lid may lie open in a plane below the plane of said bottom portion when swung back therefrom, said lid and said bottom portion having external bows adapted to support said lid and said bottom portion in said two planes above the ground the bows on said bottom portion extending in forward-rearward directions whereby said box may be rocked upon them; pivot struts pivotally connected to said tent mounting adjacent the forward end thereof and at opposite sides thereof and to said automobile and extending upwardly and forwardly from the points of connection to said automobile to the points of connection to said tent mounting so that said tent mounting is swung upwardly in order to be swung rearwardly; support means for maintaining said box in a forwardly swung position upon said automobile; and legs for supporting said box in a temporary position between said last named position and a position in which said bows rest upon the ground.

2. In a tent mounting for attachment to an automobile: a box, for holding a folded tent; adapted to be carried on the rear deck of an automobile, and having a rearward side extending below the bottom of said box; a support extending upward from said automobile and adapted to engage the bottom of said box forwardly of said rearward side; and pivot struts extending upwardly from positions at the sides of said automobile and engaging said box pivotally adjacent the forward end of said box, said struts inclining forwardly when said box is in travelling position on said automobile, the arcs through which said struts pivot lying beyond the ends of said support.

References Cited in the file of this patent

UNITED STATES PATENTS

| | | |
|---|---|---|
| 1,185,981 | Campbell | June 6, 1916 |
| 1,527,016 | Senior | Feb. 17, 1925 |
| 2,210,540 | Nielson | Aug. 6, 1940 |
| 2,459,026 | Hardy | Jan. 11, 1949 |
| 2,521,815 | Will | Sept. 12, 1950 |
| 2,642,587 | Taylor | June 23, 1953 |